United States Patent
Greiner

(10) Patent No.: US 7,063,430 B2
(45) Date of Patent: *Jun. 20, 2006

(54) COLORED LIGHTING DEVICE

(75) Inventor: Horst Greiner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 409 days.

This patent is subject to a terminal disclaimer.

(21) Appl. No.: 10/050,249

(22) Filed: Jan. 16, 2002

(65) Prior Publication Data

US 2002/0097354 A1 Jul. 25, 2002

(30) Foreign Application Priority Data

Jan. 20, 2001 (DE) .................. 101 02 585

(51) Int. Cl.
*G01D 11/28* (2006.01)
*F21V 5/00* (2006.01)

(52) U.S. Cl. .......................... 362/30; 362/27

(58) Field of Classification Search ................. 362/26, 362/31, 800, 23, 27, 29, 30, 612, 613; 349/62, 349/64, 65

See application file for complete search history.

(56) References Cited

U.S. PATENT DOCUMENTS

| | | | | |
|---|---|---|---|---|
| 2,945,313 A | * | 7/1960 | Hardesty | 362/23 |
| 2,948,073 A | * | 8/1960 | Roper | 362/26 |
| 3,077,535 A | * | 2/1963 | Dupree | 362/26 |
| 4,998,804 A | * | 3/1991 | Horiuchi | 362/26 |
| 5,115,379 A | * | 5/1992 | Nagai | 362/23 |
| 5,537,300 A | * | 7/1996 | Kraines et al. | 362/31 |
| 6,404,131 B1 | * | 6/2002 | Kawano et al. | 362/800 |

FOREIGN PATENT DOCUMENTS

EP 0921568 6/1999

* cited by examiner

*Primary Examiner*—Y. My Quach-Lee

(57) ABSTRACT

A lighting device for generating mixed colors comprises a light emission surface and a plurality of light sources of different colors, including an optical waveguide plate into which a plurality of cavities is provided. Each cavity accommodates a light source and has an upper side and side walls. The upper side faces the light emission surface and is coated with a first reflecting layer. The coupling of light into the optical waveguide plate takes place through the side walls.

20 Claims, 2 Drawing Sheets

COLORED LIGHTING DEVICE

The invention relates to a colored lighting device for generating mixed colors, comprising a light emission surface and a plurality of light sources (such as, for example, light-emitting diodes) of various colors, which device is suitable in particular for backlighting of liquid crystal displays such as LCD picture screens, or for use as a planar light radiator.

It is known to mix light from light-emitting diodes (LEDs) of different colors so as to obtain a desired mixed color. A problem here is, however, to generate the mixed color evenly and homogeneously, i.e. without color and brightness deviations, on a larger surface. These difficulties fundamentally arise from the fact that the luminous intensity and the light color of the individual light-emitting diodes, even of those of the same type, can fluctuate comparatively strongly, and that a homogeneous distribution of the light supplied by each light source over the light emission surface is possible to an insufficient degree only.

Several possibilities are described in EP 0 921 568 for combining light from light-emitting diodes of various colors such that white light is generated. According to FIG. 9 therein, for example, LED modules with blue, red, green, and yellow light are arranged on a carrier material at certain distances to one another. The mixing of the light emitted by the individual LED modules takes place by means of respective associated prisms, so that substantially white light arises in a central region of the carrier material. It is furthermore proposed to achieve a radiation of the generated light which is as even as possible by means of a carrier material for the LEDs which is curved in a certain way, or to use lens arrangements, diffuser plates, ledges, or carrier materials with a certain stepped arrangement for this purpose.

The disadvantages of these arrangements are that their manufacture is comparatively expensive and that much space is occupied, and also that the evenness and homogeneity of the emitted light as regards its color and brightness is insufficient for many applications, in particular on larger surface areas.

It is accordingly an object of the invention to provide a lighting device of the kind mentioned in the opening paragraph by means of which light can be generated with a desired color and a high homogeneity and evenness as regards the light color and brightness, in particular also for a larger light emission surface.

This object is achieved by means of a lighting device for generating mixed colors, which device comprises a light emission surface and a plurality of light sources of different colors, and which is characterized, according to claim 1, by an optical waveguide plate into which a plurality of cavities is provided, each cavity accommodating a light source, and each cavity having an upper side facing the light emission surface and side walls, said upper side being coated with a first reflecting layer, while the coupling of the light into the optical waveguide plate takes place through the side walls.

This solution combines various advantages. The manufacture of this lighting device is substantially simpler than the manufacture of the lighting devices known from the prior art cited above because no structures associated with each light source are necessary in addition to the cavities. The dimensions of the lighting device are defined substantially by the dimensions of the optical waveguide plate, so that not only a small constructional depth, but also a light emission surface of practically any desired dimensions can be realized. A desired light intensity may be achieved through a suitable choice of the number of light sources.

A further essential advantage is that the light of each individual light source distributes itself substantially homogeneously over the entire optical waveguide plate, but cannot hit the light emission surface directly coming from the respective light source, so that the emerging light is practically not dependent on the individual properties of the light sources used such as, for example, fluctuations in the luminous intensity or in the color properties. Nevertheless, a very large portion of the light supplied by each light source is available at the light emission surface owing to the nature of the light coupling, so that the losses are low and the efficiency of the light sources is high.

The dependent claims relate to advantageous further embodiments of the invention.

A particularly high homogeneity of the colored light on the light emission surface is achieved with the embodiments as claimed in claims 2 and 9 to 11, because no part of the light originating from the light sources is capable of arriving directly at the light emission surface.

The efficiency of the light sources is further enhanced in the embodiments as claimed in claims 3, 7, and 8, while the embodiments of claims 4 and 5 can be manufactured in a particularly simple manner.

With the choice of the light sources as claimed in claim 6, finally, practically any mixed color as desired can be generated at low cost, because the contribution of each of the three colors to the mixed color can be determined in a comparatively simple manner through a corresponding adjustment of the supply voltage of the associated light sources.

Further particulars, features, and advantages of the invention will become apparent from the ensuing description of a preferred embodiment, which is given with reference to the drawing, in which.

Figure 1:
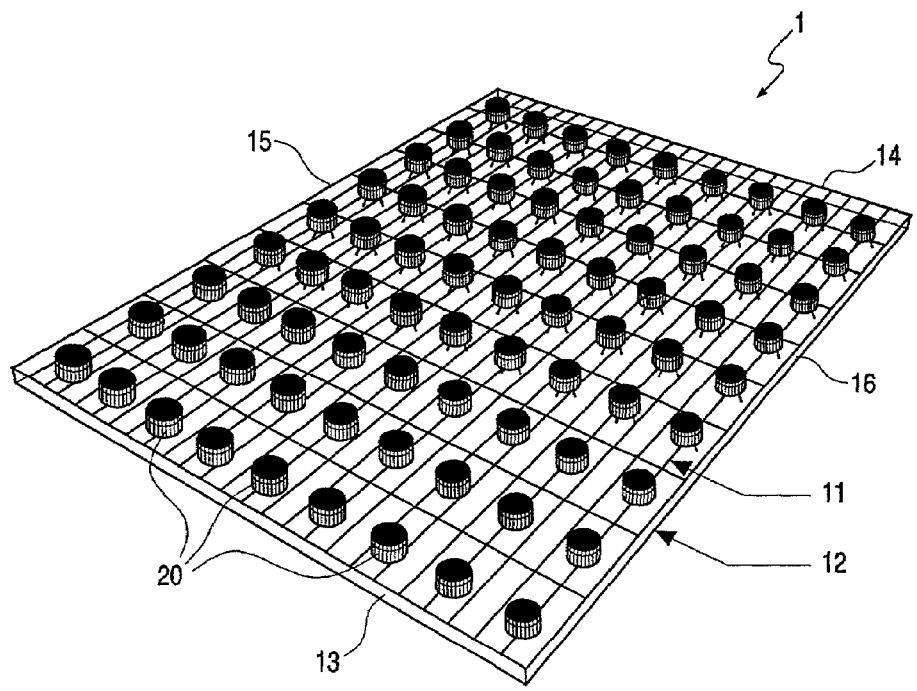
FIG. 1 is a perspective view of the preferred embodiment.

FIG. 1 shows a rectangular optical waveguide plate 1 which is manufactured from a material transparent to light. The plate comprises at its upper side a light emission surface 11 from which the light is coupled out in a known manner, a lower side 12 opposite thereto, and four side faces 13 to 16. A plurality of cylindrical cavities 20 (indicated diagrammatically) for light sources are recessed into the lower side of the plate 1 so as to extend in the direction of the light emission surface 11.

The cavities are preferably evenly distributed over the optical waveguide plate in a regular grid arrangement. The number and mutual distances of the cylindrical cavities may be chosen as desired in dependence on the size of the lighting device, the desired luminous intensity at the light emission surface, and the nature of the light sources.

The optical waveguide plate 1, and in particular its light emission surface 11, need not necessarily be rectangular. Alternative shapes such as, for example, square, round, or oval shapes, etc. are also possible. The cavities may have cross-sections other than circular cross-sections, for example rectangular or polygonal cross-sections.

Figure 2:
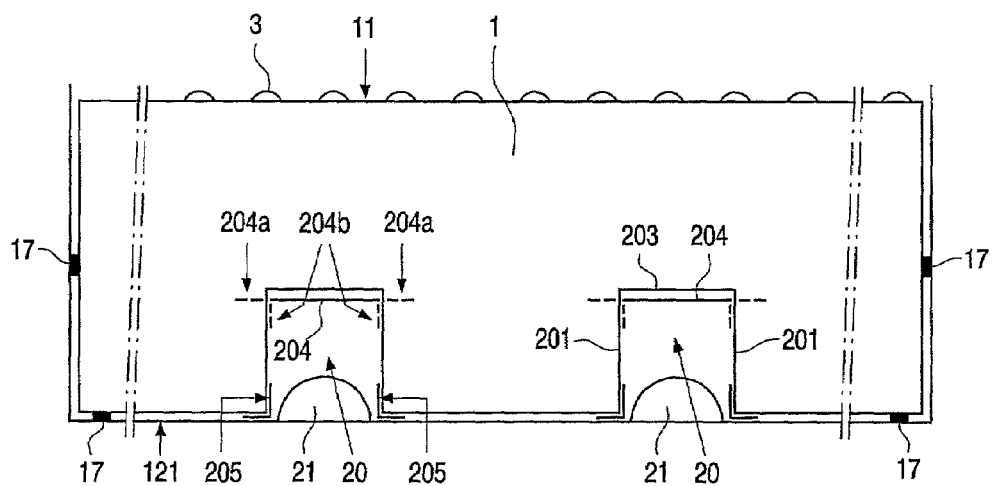
FIG. 2 is a cross-sectional view of the lighting device of FIG. 1.

FIG. 2 is a cross-sectional view of the optical waveguide plate 1 in the region of two cavities 20, each having side walls 201 and an upper side 203.

A substantially point-shaped light source 21, for example a light-emitting diode, is present in each cavity 20. The color of the light source (basic color) inserted in a cavity 20 is preferably chosen such that there are no groups of mutually adjoining light sources of the same color, i.e. the light sources lying in mutually adjoining cavities generate light of different (basic) colors. The homogeneity of the mixed color is further improved thereby.

Each basic color from which the mixed color is composed is generated by a plurality of light sources 21. This has the result that fluctuations in the luminous intensity and/or the light color of the light sources of the same type are smoothed out and averaged, so that deviations or a total failure of individual light sources are of no importance, and no expensive electronic controls or other measures are required for taking into account the usual tolerance ranges of the light sources.

The side walls 201 of the cavities 20, which extend substantially perpendicularly to the light emission surface 11 of the optical waveguide plate 1, are formed by the material of the optical waveguide plate 1, whereas the upper sides 203 of the cavities, which extend substantially parallel to the light emission surface 11, are provided with a first layer 204 which is highly reflecting at both sides.

There are two possibilities here. The first is that the first layer 204 is directly provided on the upper side 203 of the cavity 20, so that no gap or intervening space is present between the upper side 203 and the first layer 204. This results in an optical contact between this layer and the optical waveguide plate 1, in which case the layer should be as mirroring as possible. Alternatively, it is possible to provide a space between the first layer 204 and the upper side 203 of the cavity in the direction of the inner space thereof, so that a gap arises, while the layer may be, for example, slightly concavely curved in the direction of the light source 21. In this case there is no optical contact between the first layer 204 and the optical waveguide plate 1, and the light from the plate 1 is reflected back already at the upper side 203 of the cavity through total reflection, i.e. the transition surface between the material of the optical waveguide plate and the gap, into the plate. Since this reflection causes only very low losses, it is generally preferred to provide a space between the first layer 204 and the upper side 203.

Figure 3:
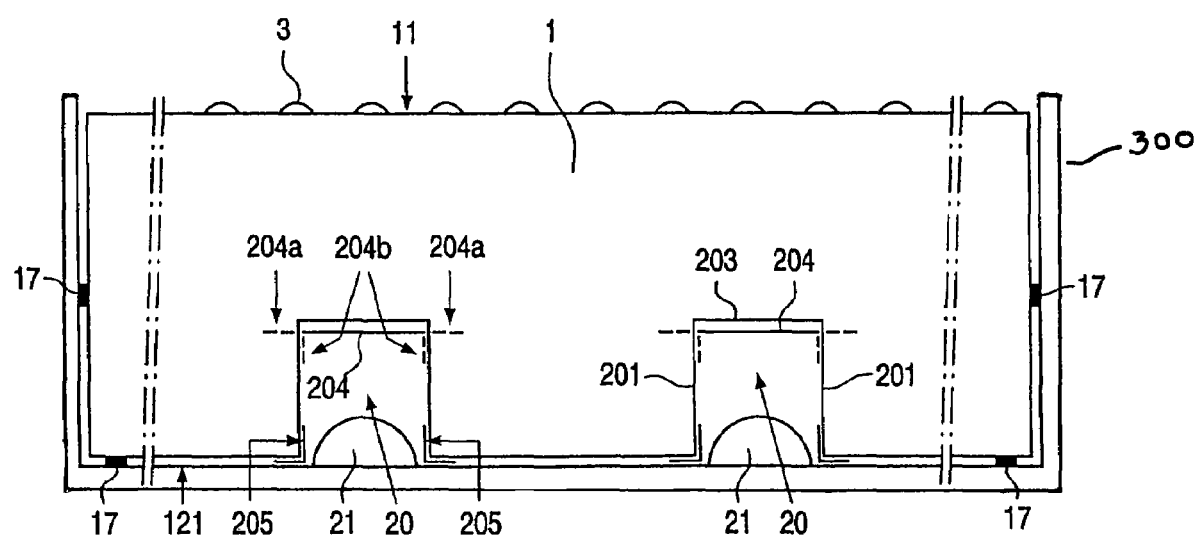
FIG. 3 is a cross-sectional view of a lighting device similar to that shown in FIG. 2, but including a housing.

The lower side of the cavity 20, finally, is covered by a highly reflecting second layer 121. This layer may be provided, for example, on a bottom wall as well as, preferably, on the inside walls of a housing (see element 300 in FIG. 3) which surround the optical waveguide plate 1, so that the second reflecting layer 121 covers the entire lower side 12 and also the side faces 13 to 16, which means that there is no optical contact with the covered surfaces from the outside.

A plurality of extraction elements 3, by means of which the light is coupled out from the optical waveguide plate 1 in a known manner, is finally present on the light emission surface 11.

The light sources are preferably fastened to the bottom wall of a housing in the assembly of the lighting device. Then the optical waveguide plate 1 is inserted into the housing with its cavities 20 provided in the correct locations, so that each light source 21 lies in a respective cavity. Furthermore, spacers 17 are provided between the side faces 13 to 16 of the optical waveguide plate and the inside walls of the housing as well as between the lower side 12 of the optical waveguide plate and the bottom wall of the housing, which spacers distance the second reflecting layer 121 (on the housing inner walls) from the optical waveguide plate, so that an air gap remains between the layer 121 on the one hand and the side faces 13 to 16 and the lower side 12 on the other hand.

The light rays issuing from the light sources 21 can enter the material of the optical waveguide plate 1 only through the side walls 201 of the cavities 20. They distribute themselves in the optical waveguide plate 1 through substantially loss-free total reflection against the side faces 13 to 16 and the lower side 12 of the optical waveguide plate 1 or the second layer 121 provided thereon, until they are coupled out at the light emission surface 11. This is to be described in detail below.

When a light ray propagating in the optical waveguide plate hits the side wall 201 of a cavity 20, it will enter the latter, will be scattered inside the cavity against the light source 21 and/or the highly reflecting first or second layer 204, 121, and will leave the cavity again through the side wall 201.

When a light ray propagating in the optical waveguide plate hits the outer upper side 203 of a cavity, it will either be reflected against the first layer 204, if this is in optical contact with the upper side as described in the alternatives above, or it is subjected to a total reflection against the upper side 203 if there is no optical contact with the first layer 204, so that the light ray is conducted past the cavity 20 in both cases.

This kind of light coupling and light propagation leads to a very homogeneous distribution of the light of each individual light source in the entire optical waveguide plate 1, and in particular to a very homogeneous distribution of the contributions of the individual light sources, i.e. light-emitting diodes, to the light coupled out at the light emission surface 11. This results in an even mixing of the generated basic colors and thus to a homogeneous mixed color of constant brightness and constant color quality over the entire light emission surface. Since the light of each light source is distributed over the entire optical waveguide plate, moreover, the influence of an individual light source owing to, for example, a changing intensity or color, or a failure, will be small and hardly noticeable.

These properties are improved as the number of light sources is increased. Light-emitting diodes, which are comparatively small and can be manufactured inexpensively, are particularly suitable for achieving as high as possible a number of light sources per unit surface area of the optical waveguide plate. At the same time, a large number of light-emitting diodes obviously also achieves a correspondingly high luminous intensity on the light emission surface.

To generate light of a desired color, light sources of suitable basic colors are first chosen, from which the desired color (mixed color) can be obtained through mixing of light. Three or four basic colors are usually sufficient for this, which colors can be generated, for example, by means of red, green, and blue, as well as possibly yellow light-emitting diodes. The light-emitting diodes are then each inserted into a cavity 20 in a distribution as described above. The exact attunement of the mixed color or a switch-over between different colors may then be achieved by electronic means through a suitable adjustment of the supply voltage and thus of the brightness of the light-emitting diodes having the relevant basic color.

The light coupled out in a known manner by means of the extraction elements 3 may serve, for example, for illuminating a liquid crystal display or an LCD picture screen arranged on the light emission surface 11. The evenness of the illumination may be further improved through a suitable dimensioning and arrangement of the extraction elements, which arrangement may possibly be irregular.

The optical waveguide plate 1 is preferably present in a housing (not shown) with walls which are coated with the second layer 121 and which cover the lower side 12 and the side faces 13 to 16, as shown in FIG. 2, so that there is no optical contact with the covered surfaces from the outside. The second layer 121 may be mirroring or diffusely reflecting in this case.

There is the possibility, furthermore, to provide the second layer 121 directly on the relevant side faces 13 to 16 and the lower side 12, in which case the spacers 17 will be absent. This has indeed the disadvantage that part of the incident light can be directly reflected from the side faces to the light emission surface 11, in particular if the second layer is diffusely reflecting, which would lead to adverse effects. These effects may be substantially reduced if the second layer is specularly reflecting, but such layers are substantially more expensive, because they can only be manufactured with a comparatively high reflectivity and provided on the surfaces of the optical waveguide plate at a high expense.

It was surprisingly found that this problem can be solved when the second layer 121 is not directly provided on the relevant side faces 13 to 16 and the lower side 12, but instead has a distance of, for example, 0.1 mm to the optical waveguide plate, so that there is no optical contact between the two because of the presence of an air gap. The spacers 17 are provided for this purpose.

Now when a light ray leaves the optical waveguide plate 1 through one of the side faces 13 to 16 (or the lower side 12), it will first be diffracted at the side face, traverse the air gap, and be reflected back from the preferably diffusely reflecting second layer 121. After traversing the air gap once more, it enters the optical waveguide plate 1 again and again complies with the conditions for total reflection, provided the refractive index of the plate is not below 1.41.

As a result of this, those portions of the light which leave the optical waveguide plate through the side faces or the lower side are reflected back into the plate again. White foils or white paints, which are commercially available with reflectivity values of above 95 to 98%, may be used for manufacturing the second layer 121. It is obviously also possible to use a specularly reflecting second layer 121. A diffusely reflecting layer, however, has the advantage that the light after reflection is even better distributed inside the optical waveguide plate, and that this layer can be manufactured with a higher reflectivity value and at a lower cost than a specularly reflecting layer.

A very effective coupling of the light is thus possible with this configuration, as well as a homogeneous and substantially loss-free distribution of the light from a large number of light sources.

It was further found to be advantageous to continue the highly reflecting first layer 204 at the upper side 203 of each cavity 20 either with a first portion 204a (shown in broken lines in FIG. 2) over a few millimeters in horizontal direction into the optical waveguide plate 1 (the optical waveguide plate would have to be composed of two layers for this purpose) or, alternatively, (in particular if the layer is realized by vapor deposition), the layer may be continued with a second portion 204b (shown in broken lines in FIG. 2) in a direction perpendicular thereto around the upper inner edges of the cavity and along the side walls over a few millimeters in downward direction. It is avoided by each of these portions that undesirable scattered light is generated at the edges of the cavity.

For this purpose, furthermore, the regions of the side walls 201 or the lower side 12 of the optical waveguide plate 1 which adjoin the opposite lower edges of the cavities 20 may be provided with a highly reflecting third layer 205, which layer extends over a few millimeters along each of these regions.

It would also be possible in principle to use linear light sources instead of the substantially point-shaped light sources described above, which linear light sources are present in channels which are recessed into the optical waveguide plate, for example extending in parallel, instead of the cylindrical cavities, or which are provided on the lower side of the optical waveguide plate.

It should be noted that light sources which all radiate light of the same color may be used instead of light sources of different basic colors, for example for achieving a particularly homogeneous, high luminous intensity at the light emission surface.

It should finally be noted that the spacing of the reflecting second layer 121 from the side faces and the lower side of the optical waveguide plate is independent of the nature, number, and arrangement of the light sources. The spacing may be provided, for example, also if the light sources are not arranged in the optical waveguide plate but at one or several of the side faces thereof. In this case, too, such a reflecting, spaced layer at the remaining side faces would achieve the advantages described above as regards a substantially loss-free back-reflection of the light issuing through the relevant side faces, complying with the conditions for total reflection.

The invention claimed is:

1. A lighting device for generating mixed colors, which device comprises a light emission surface and a plurality of light sources of different colors, including an optical waveguide plate into which a plurality of cavities is provided, each cavity accommodating a light source, and each cavity having an upper side facing the light emission surface and side walls, said upper side being coated with a first reflecting layer, while the coupling of the light into the optical waveguide plate takes place through the side walls.

2. The lighting device of claim 1, wherein the side walls of the cavities extend substantially perpendicularly to the light emission surface, and the upper sides of the cavities extend substantially parallel to the light emission surface.

3. The lighting device of claim 1, wherein the cavities are coated with a second reflecting layer at their lower sides opposite to the upper sides.

4. The lighting device of claim 3, wherein the second reflecting layer extends over the side faces and a lower side of the optical waveguide plate.

5. The lighting device of claim 4, wherein the second reflecting layer is at a distance from the optical waveguide plate, which distance constitutes an air gap.

6. The lighting device of claim 1, wherein the cavities are provided in a lower side of the optical waveguide plate.

7. The lighting device of claim 1, wherein the light sources comprise a plurality of red, green, and blue light-emitting diodes which are distributed such that no light sources of the same color lie in mutually adjoining cavities.

8. The lighting device of claim 1, wherein the first reflecting layer is prolonged by a portion continuing horizontally into the optical waveguide plate.

9. The lighting device of claim 1, wherein the first reflecting layer is prolonged by a portion continuing along the side walls of the cavity.

10. The lighting device of claim 1, wherein the edges of the cavities lying opposite the upper side are covered by a second reflecting layer.

11. A liquid crystal display incorporating the lighting device of claim 1.

12. The lighting device of claim 1, further comprising a plurality of light extraction elements disposed directly on the light emission surface.

13. A lighting device, comprising:
a housing;
a plurality of light sources of different colors; and
an optical waveguide plate disposed within the housing, the optics waveguide plate having a light emission surface,
wherein a plurality of cavities are defined within the optical waveguide plate, each cavity accommodating one of the light sources, each cavity having an upper side facing the light emission surface and side walls, said upper side being coated with a first reflecting layer, wherein the coupling of the light into the optical waveguide plate takes place through the side walls, and
wherein the optical waveguide mixes the colors of the light sources to output a mixed color light through the light emission surface.

14. The lighting device of claim 13, wherein the light sources comprise a plurality of red, green, and blue light-emitting diodes which are distributed such that no light sources of to same color lie in mutually adjoining cavities.

15. The lighting device of claim 13, wherein the cavities are coated with a second reflecting layer at teir lower sides opposite to the upper side.

16. The lighting device of claim 15, wherein the second reflecting layer extends over the side faces and a lower side of the optical waveguide plate.

17. The lighting device of claim 16, wherein the second reflecting layer is at a distance from the optical waveguide plate, which distance constitutes an air gap.

18. The lighting device of claim 16, wherein the second reflecting layer is provided on inside walls of the housing.

19. The lighting device of claim 15, wherein the edges of the cavities lying opposite the upper side are covered by a third reflecting layer.

20. The lighting device of claim 13, wherein the first reflecting layer is prolonged by a portion continuing along the side walls of the cavity.

* * * * *